(12) United States Patent
Versolato et al.

(10) Patent No.: US 11,656,147 B2
(45) Date of Patent: May 23, 2023

(54) SYSTEM OF INDIRECT ESTIMATION OF THE CONDITION OF WEAR OF A CUTTING TOOL

(71) Applicants: Airbus (S.A.S.), Blagnac (FR); Airbus Operations (S.A.S.), Toulouse (FR)

(72) Inventors: Florian Versolato, Toulouse (FR); Jean-Marie Dautelle, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 17 days.

(21) Appl. No.: 17/164,969

(22) Filed: Feb. 2, 2021

(65) Prior Publication Data

US 2021/0239563 A1    Aug. 5, 2021

(30) Foreign Application Priority Data

Feb. 3, 2020 (FR) ...................................... 2001062

(51) Int. Cl.
*G01M 5/00* (2006.01)
*B23C 9/00* (2006.01)
(Continued)

(52) U.S. Cl.
CPC .............. *G01M 5/0033* (2013.01); *B23C 9/00* (2013.01); *B23Q 17/09* (2013.01); *G06N 20/00* (2019.01); *G05B 2219/50203* (2013.01)

(58) Field of Classification Search
None
See application file for complete search history.

(56) References Cited

U.S. PATENT DOCUMENTS 4,656,868 A * 4/1987 Azuma .............. G05B 19/4065
                                                      83/72
4,853,680 A * 8/1989 Thomas ............. B23Q 17/0957
                                                     73/104
(Continued)

FOREIGN PATENT DOCUMENTS

CN      106 863 008 A      6/2017
CN      107 738 140 A      2/2018
(Continued)

OTHER PUBLICATIONS

XuanTruong Duong et al."Initial tool wear behavior during machining of titanium metal matrix composite (TiMMMCs)" Jul. 27, 2016, Int. Journal of Refractory Metals and Hard Materials 60 (2016) 169-176 downloaded from file:///C:/Users/dkaravias/Downloads/1-s2.0-S0263436816301858-main.pdf on Sep. 21, 2022 (Year: 2016).*
(Continued)

*Primary Examiner* — Eman A Alkafawi
*Assistant Examiner* — Denise R Karavias
(74) *Attorney, Agent, or Firm* — KDW Firm PLLC

(57) ABSTRACT

A method and a system for estimating state of wear of a cutting tool mounted on a machine tool. The system includes an acquisition module configured to acquire at least one operating signal specific to the cutting tool during at least one interaction of introduction or of extraction between the cutting tool and the material to be machined, and a microprocessor configured to generate from the at least one operating signal a wear signature of the cutting tool and to determine the state of wear of the cutting tool as a function of the signature.

10 Claims, 6 Drawing Sheets

(51) Int. Cl.
B23Q 17/09 (2006.01)
G06N 20/00 (2019.01)

(56) References Cited

U.S. PATENT DOCUMENTS

| | | | |
|---|---|---|---|
| 5,523,701 | A | 6/1996 | Smith et al. |
| 11,378,492 | B2 | 7/2022 | Versolato et al. |
| 2003/0045976 | A1 | 3/2003 | Bechhoefer |
| 2004/0179915 | A1* | 9/2004 | Hill .................... B23Q 17/0971 409/141 |
| 2018/0150038 | A1 | 5/2018 | Lin et al. |
| 2018/0246494 | A1 | 8/2018 | Nakahama |
| 2019/0033053 | A1 | 1/2019 | Eppler et al. |
| 2019/0152011 | A1* | 5/2019 | Kummari ............... G06N 20/20 |
| 2019/0210176 | A1* | 7/2019 | Yamamoto ......... G05B 19/4065 |
| 2019/0258222 | A1 | 8/2019 | Faria |

FOREIGN PATENT DOCUMENTS

| | | |
|---|---|---|
| EP | 1 342 534 A2 | 9/2003 |
| EP | 3 001 265 A1 | 3/2016 |
| JP | S61 252052 A | 11/1986 |
| JP | H06 198547 A | 9/1994 |
| WO | WO 2017/192821 A1 | 11/2017 |

OTHER PUBLICATIONS

Zadeh, "Initial Tool Wear Mechanisms in Turning of Titanium Metal Matrix Composites," 2016, downloaded from https://publications.polymtl.ca/2235/1/2016_SaeidKamaliZadeh.pdf, on Dec. 9, 2022 (Year: 2016).*

French Search Report for Application No. 2001062 dated Oct. 8, 2020.

French Search Report for Application No. 2001061 dated Sep. 28, 2020.

Non-Final Office Action for U.S. Appl. No. 17/164,994 dated Sep. 15, 2021.

Notice of Allowance for U.S. Appl. No. 17/164,994 dated Mar. 7, 2022.

* cited by examiner

SYSTEM OF INDIRECT ESTIMATION OF THE CONDITION OF WEAR OF A CUTTING TOOL

CROSS-REFERENCE TO RELATED APPLICATION

This application claims priority to French Patent Application FR 2001062 filed Feb. 3, 2020, the entire disclosure of which is incorporated by reference herein.

TECHNICAL FIELD

The disclosure herein relates to the field of estimating the state of wear of a cutting tool during machining.

BACKGROUND

Industrially and in particular in the aerospace industry, specialized, numerically controlled machine tools (boring-drilling machines, milling machines) are used which make it possible to machine complex and highly precise shapes. The machining process comprises the application of a cutting or machining pattern to a material such as titanium. Cutting materials slowly damages the cutting tool, the state of wear of which has to be monitored in order that the machining is always performed with the highest degree of precision.

In general, the state of wear of a cutting tool is estimated by direct means by using optical measurement tools such as, for example, stereoscopic microscopes. The measurements taken by using this type of tools are repeatable and exhibit an acceptable degree of precision but are very tedious and require that the edge of the blades be visually inspected in order to measure the length and depth of the wear. This takes a lot of time and delays the overall production process. Specifically, this type of measurements has the drawback of having to be taken outside of the machining process and therefore necessitates a non-negligible production downtime.

There are indirect measurement means which consist in producing an estimate of a level of wear of a cutting tool according to a count of the machining time on the basis of a preset service life of the cutting tool. However, this estimate is imprecise given the fact that the rate of wear is a variable phenomenon which depends on numerous factors. Additionally, the service life defined prior to machining is specified according to a conservative criterion which leads to wastage of cutting tools. Given that cutting tools may be very expensive, their partial use represents a considerable money loss.

SUMMARY

An object of the disclosure herein is therefore to propose an indirect system or method which automates the estimation of the state of wear of a cutting tool during machining and which exhibits a very high degree of precision with respect to the prior art, thereby avoiding wastage of cutting tools while necessitating no machining downtime.

The disclosure herein relates to a system for estimating the state of wear of a cutting tool mounted on a machine tool, the system comprising:
  an acquisition module configured to acquire at least one operating signal specific to the cutting tool during at least one introduction or withdrawal interaction between the cutting tool and the material to be machined, and
  a microprocessor configured to generate, on the basis of the at least one operating signal, a wear signature of wear of the cutting tool and to determine the state of wear of the cutting tool according to the signature.

This system allows very precise (with an error of about 1%), rapid, repeatable and real-time estimation of the level of wear of a cutting tool during machining. Thus, this system necessitates no machining downtime and makes it possible to avoid wastage of cutting tools.

According to a first embodiment, the acquisition module is configured to acquire an exit operating signal when the cutting tool is withdrawn from the material.

This makes it possible to determine whether the tool is still usable for another machining operation.

According to a second embodiment, the acquisition module is configured to acquire an entry operating signal when the cutting tool is introduced into the material and an exit operating signal when the cutting tool is withdrawn (i.e. removed) from the material.

The acquisition of both entry and exit operating signals makes it possible to determine a level of wear per part machined.

Advantageously, the operating signal specific to the cutting tool mounted on the machine tool is a signal selected from among the following signals: power of the electric current flowing in the machine tool, torque, intensity of electric current flowing in the machine, and vibration.

Some of these signals (current intensity, power) are generally already available from the machine tool and thus it is not necessary to install new sensors: it is just a matter of connecting to the machine. The vibration signal gives a precise indication of the wear of the cutting tool but potentially requires the installation of a vibration sensor at the spindle of the machine tool.

Advantageously, the wear signature is defined by a rolling standard deviation of the at least one operating signal.

The standard deviations of the signal when the tool is introduced or withdrawn constitute a clear indicator of the wear of the cutting tool. Specifically, the rolling standard deviation, over this period, increases as a function of the increase in wear.

Advantageously, the microprocessor is configured to determine the state of wear of the cutting tool of interest by using a predetermined wear model that models the state of wear of a cutting tool of the same type as the cutting tool in operation according to the values of the rolling standard deviation.

According to one embodiment, in a training phase, the acquisition module is configured to:
  detect the start and/or the end of each training machining sequence from among a succession of sequences,
  acquire a set of values of the operating signal specific to the cutting tool when each training machining sequence starts and/or ends,
  acquire a set of actual measurements of the wear over the succession of sequences, taking each actual wear measurement after a determined number of training machining sequences, and
the microprocessor is configured to:
  calculate a rolling standard deviation per machining sequence on the basis of the values of the operating signal that are acquired in the training machining sequence, thus forming a set of signatures,
  construct the wear model by applying a regression technique configured to calibrate the set of signatures on the set of actual wear measurements, and validate the wear model when the difference between the actual wear measurements and the wear values estimated by the wear model does not cross a predetermined threshold.

Thus, the system makes it possible to construct, in a straightforward and precise manner, a wear model that is able to estimate the level of wear in accordance with the actual wear of the cutting tool.

Advantageously, the succession of training machining sequences starts with a new cutting tool and ends when the cutting tool is fully worn.

This makes it possible to calibrate the various levels of wear of the cutting tool.

Another subject of the disclosure herein is a machine tool comprising the system for estimating the state of wear of a cutting tool according to any one of the preceding features.

A further subject of the disclosure herein is a method for estimating the state of wear of a cutting tool mounted on a machine tool, the method comprising the following steps:
  acquiring at least one operating signal specific to the cutting tool during at least one introduction or withdrawal interaction between the cutting tool and the material to be machined,
  generating, on the basis of the at least one operating signal, a wear signature of wear of the cutting tool, and determining the state of wear of the cutting tool according to the signature.

BRIEF DESCRIPTION OF THE DRAWINGS

Other particularities and advantages of the device and of the method according to the disclosure herein will become more clearly apparent from reading the description that is given below, by way of non-limiting indication, with reference to the appended drawings, in which.

DETAILED DESCRIPTION

The principle of the disclosure herein consists in or comprises estimating the state of wear of a cutting tool during the machining process by interpreting a relevant signal coming from the machine tool only with respect to at least one distinctive machining action.

Figure 1:
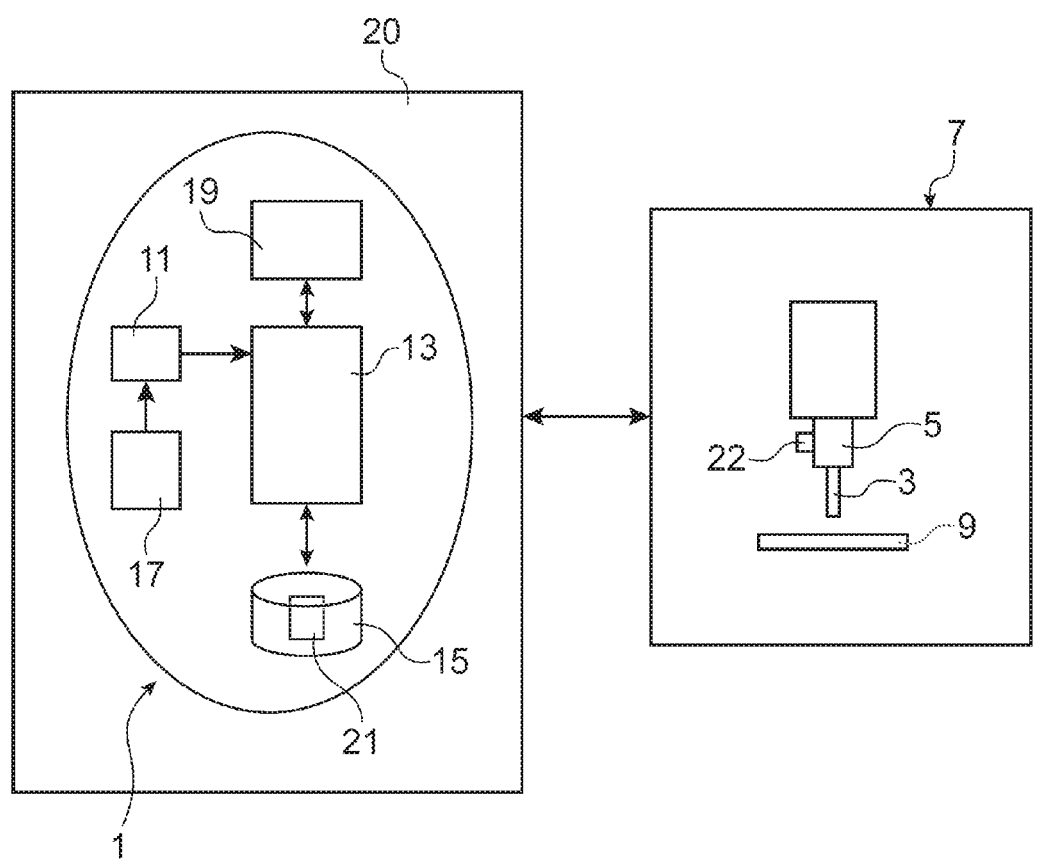
FIG. 1 schematically illustrates a system for estimating the state of wear of a cutting tool, according to one embodiment of the disclosure herein.

FIG. 1 schematically illustrates an estimation system 1 for estimating the state of wear of a cutting tool 3, according to one embodiment of the disclosure herein.

The cutting tool 3 is mounted on a spindle 5 of the numerically controlled machine tool 7 allowing programmed shapes to be machined on a part 9 to be machined. In general, the machine tool 7 is fitted with a magazine in which various cutting tools (drill bits, reamers, milling cutters, etc.) are located. Thus, the term "cutting tool" refers to any type of cutting tool that may be mounted on the machine tool 7.

According to the disclosure herein, the estimation system 1 comprises an acquisition module 11, a microprocessor 13, a storage unit 15, an input interface 17 (a keyboard, for example) and an output interface 19 (a screen, for example). Advantageously, all of these hardware elements of the estimation system 1 are already integrated within a control device 20 for the machine tool 7.

The acquisition module 11 is configured to acquire at least one operating signal specific to the cutting tool (mounted on the machine tool) during at least one relevant interaction between the cutting tool and the material to be machined. The relevant interaction consists of or comprises the introduction of the cutting tool into the material to be machined and/or the withdrawal of the cutting tool from the material of the part to be machined.

The operating signal specific to the cutting tool 3 is a signal coming from the machine tool 7 when the cutting tool is introduced (or withdrawn) into (or from) the material of the part to be machined.

Advantageously, this operating signal is a signal which comes from sensors 22 that are already present at the spindle 5 of the machine tool 7. In particular, the operating signal may be a signal of electrical power of the spindle 5 of the machine tool 7, a torque signal, or a signal of intensity of electric current flowing in the machine tool. Specifically, the more the cutting tool 3 is worn, the greater the force exerted by the machine tool 7, thus entailing an increase in the torque, current intensity, power consumption and vibration, etc.

Other types of operating signals that come from the machine tool 7 may be used such as, for example, a vibration signal. In this case, a vibration sensor is installed at the spindle 5 of the machine tool 7 if the latter is not already equipped with such a sensor.

In addition, the microprocessor 13 is configured to process the values of the operating signal specific to the cutting tool 3 acquired from the machine tool 7. More particularly, the microprocessor 13 is configured to generate, on the basis of the values of the operating signal, a wear signature of wear of the cutting tool. Additionally, the microprocessor 13 is configured to determine the state of wear of the cutting tool according to the signature extracted from the values of the operating signal. Advantageously, the wear signature is determined by calculating a rolling standard deviation of the operating signal.

More particularly, the microprocessor 13 is configured to determine the state of wear of the cutting tool 3 of interest by using a predetermined wear model 21 that models the state of wear of a cutting tool of the same type as the cutting tool 3 in operation according to the signature (i.e. the values of the rolling standard deviation).

Note that the operating signal acquired when the cutting tool 3 enters or exits the material of the part 9 to be machined is rich in useful information. Specifically, in this case, the cutting tool 3 has more freedom of movement, being subjected to less longitudinal stress by the material of the part 9. Additionally, the entry and exit movements are always performed identically, thus allowing the microprocessor 13 to compare the signal signatures with a high degree of precision.

Not considering the total signal over the entire machining process substantially increases estimating precision while simplifying numerical processing. Specifically, the total signal fluctuates considerably with a high level of noise over the cutting process, thereby resulting in a poorer estimate of wear. In addition, processing the total signal entails greater consumption of computing time and data storage.

Figure 2:
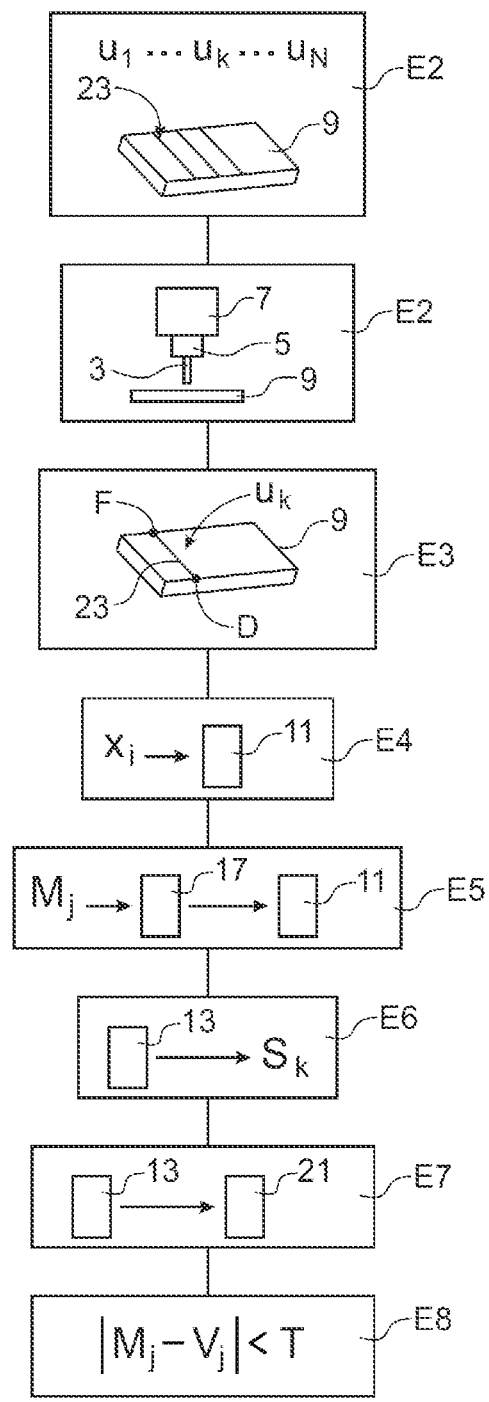
FIG. 2 is a flowchart schematically illustrating the production of a wear model in a training phase, according to one preferred embodiment of the disclosure herein.

FIG. 2 is a flowchart schematically illustrating the production of the wear model in a training phase, according to one embodiment of the disclosure herein.

The flowchart describes the training steps carried out during machining operations of a cutting tool 3 of interest in order to construct a wear model 21 relating to this tool 3. Of course, a wear model 21 is constructed for each type of cutting tool.

Step E1 relates to the tuning of a program for a succession of machining sequences $u_1, \ldots, u_k, \ldots u_N$. The succession of training machining sequences starts at $u_1$ with a new cutting tool 3 and ends at $u_N$ when the cutting tool is fully worn. The same machining pattern is always used throughout the succession of machining sequences. The pattern may, for example, be a groove 23 in the material of a part 9 made of metal. In this case, each machining sequence $u_k$ corresponds to the production of a groove 23.

Step E2 relates to the choosing and setting up of the cutting tool 3 of interest. Thus, the selected cutting tool 3 is arranged on its tool holder, the tool holder is arranged on the spindle 5 of the machine tool 7 intended for the tuning test and the part 9 to be machined is put in place.

In step E3, the acquisition module 11 is configured to detect the start D and/or the end F of each training machining sequence $u_k$ (for example each groove 23) from among the succession of sequences $u_1, \ldots u_1, \ldots, u_k, \ldots u_N$.

In step E4 the acquisition module 11 is configured to acquire a set of values $X_i$ of the operating signal specific to the cutting tool 3 when each training machining sequence $u_k$ starts D and/or ends F. As a variant, the acquisition module 11 may be configured to acquire the values at the start and at the end of a predetermined number of machining sequences.

In step E5 the acquisition module 11 is configured to acquire a set of actual measurements $M_j$ of the wear over the succession of sequences $u_1, \ldots, u_k, \ldots u_N$, taking each actual wear measurement after a determined number of training machining sequences. This determined number may be selected from within an interval of between 1 and 10 and may be dependent on the dimensions of the machining pattern and on the material of the part 9. By way of example, an actual measurement $M_1$ is taken every five machining sequences.

A measurement device is used to take the set of actual measurements of the wear of the cutting tool. The measurement device may be an optical tool such as a stereoscopic microscope or camera, or a measurement tool such as a profilometer, three-dimensional scanner, etc. This measurement device is used to directly measure the wear of the cutting tool 3. All of these actual measurements may be acquired by the acquisition module 11 via the input interface 17.

In steps E5-E8, the microprocessor 13 is configured to construct the training model 21.

More particularly, in step E5, the microprocessor 13 is configured to clean up the data by deleting, for example, inconsistent data. Additionally, the microprocessor 13 is configured to contextualize the set of actual wear measurements with the set of values of the operating signal that comes from the machine tool 7.

In step E6, the microprocessor 13 is configured to calculate a rolling standard deviation per training machining sequence $u_k$ on the basis of the values $X_i$ of the operating signal that are acquired during (the start and/or the end) of the machining sequence, thus forming a set of signatures Sk (i.e. rolling standard deviations). As a variant, the microprocessor 13 may be configured to calculate a rolling standard deviation after a predetermined number of sequences.

Specifically, FIGS. 3A to 3D are graphs illustrating the variation in the rolling standard deviation according to the wear of the cutting tool. The variation in the rolling standard deviation is represented by the ordinate and the acquisition time is represented by the abscissa. The values are reported after every five machining sequences.

Figure 3A:
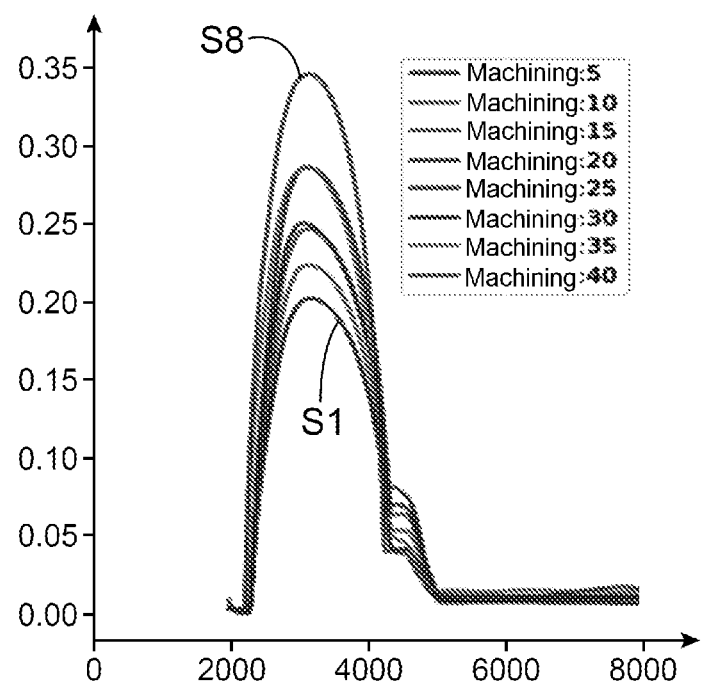
FIGS. 3A through 3D are graphs illustrating the variation in the rolling standard deviation according to the wear of the cutting tool, according to various embodiments of the disclosure herein.
Figure 3B:
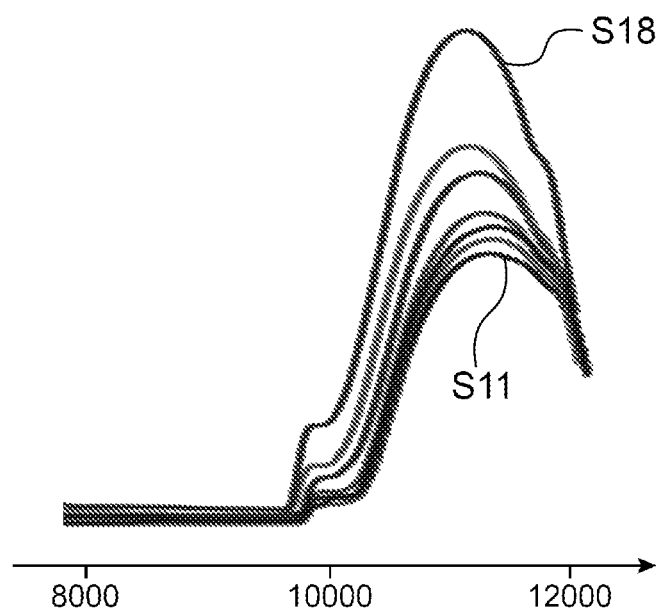
Figure 3C:
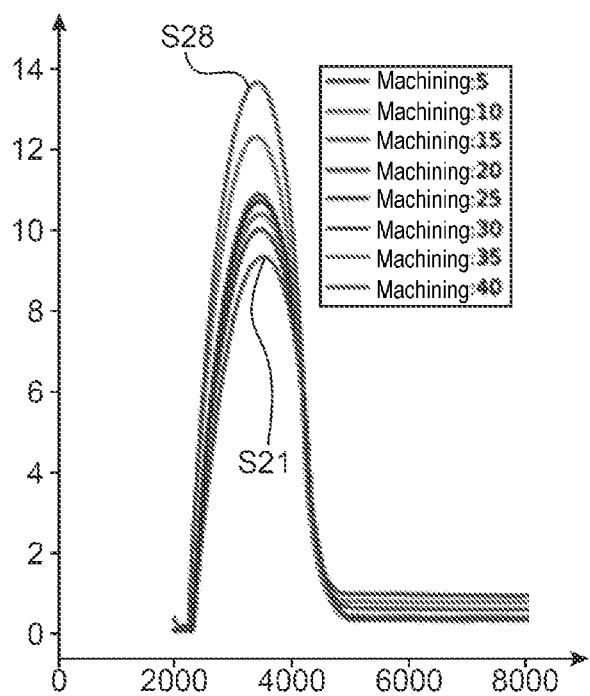
Figure 3D:
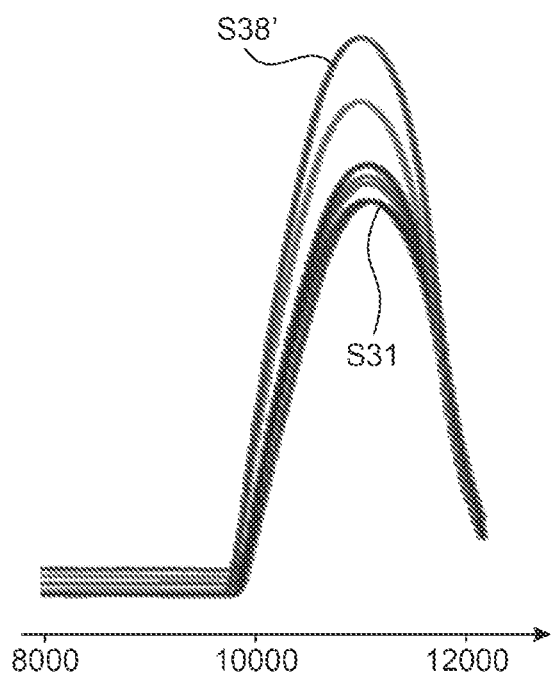

In the example of FIGS. 3A and 3B, the operating signal used is the vibration while in the example of FIGS. 3C and 3D, the operating signal used is the power.

More particularly, FIG. 3A illustrates the variation in the amplitude (maximum value) of the rolling standard deviation of the vibration at the start of each five machining sequences. Thus, each curve (or peak) represents the variation in the rolling standard deviation after five machining sequences. The first curve S1 represents the variation in the rolling standard deviation after five cutting sequences with a cutting tool having 0% wear at the start. The last curve S8 represents the variation in the rolling standard deviation after forty cutting sequences with the same cutting tool. Note that each curve has a different amplitude and that the latter increases with the number of machining operations and, therefore, with the wear of the cutting tool 3. This is due to the fact that the wear of the cutting tool 3 leads to an increase in the power required to rotate the tool and an increase in vibrations when the tool 3 enters the part 9 or exits the part 9.

FIG. 3B illustrates the variation in the amplitude of the rolling standard deviation of the vibration at the end of each five cutting sequences. Note that, as above, the amplitude of the rolling standard deviation increases with the wear of the cutting tool. The variation in the rolling standard deviation when the cutting tool 3 enters or exits thus represents the signature S (represented by curves S1-S8 and S11-S18) of the level of wear of the cutting tool 3.

FIGS. 3C and 3D are similar to FIGS. 3A and 3B, respectively, apart from the fact that the operating signal used is the power.

These graphs clearly show that the signature (i.e. the amplitude of the rolling standard deviation) of an operating signal (vibration, power, etc.) when the cutting tool enters or exits is a clear indicator of the actual wear of this tool.

The fact that the wear signature is produced on the basis of an operating signal acquired when the cutting tool 3 enters the part 9 or exits the part 9 makes it possible to have relevant information independent of the machining per se of the part 9. This makes it possible to systematically compare similar signals regardless of the machining type or pattern. Additionally, the introduction (or the withdrawal) of the cutting tool 3 into (or from) the part 9 is a more difficult operation and therefore causes more deformation than the operation of machining the part 9 with the tool 3 already inserted into the part. This generates more vibrations and requires more power from the spindle 5 than when machining the part 9 and thus provides better-quality operating signals and therefore a better estimate.

In step E7, the microprocessor 13 is configured to construct the wear model 21 by applying a regression or interpolation technique that is configured to calibrate the set of signatures Sk on the set of actual measurements $M_j$ of the wear.

In step E8, the microprocessor 13 is configured to validate the wear model 21 when the difference between the actual wear measurements $M_j$ and the wear values $V_j$ estimated by the training model 21 does not cross a predetermined threshold T. The threshold T may be determined according to the precision desired for the wear estimate and the type of operation. Note that the method according to the disclosure herein makes it possible to achieve a very high degree of precision with an error of less than 1%.

Figure 4A:
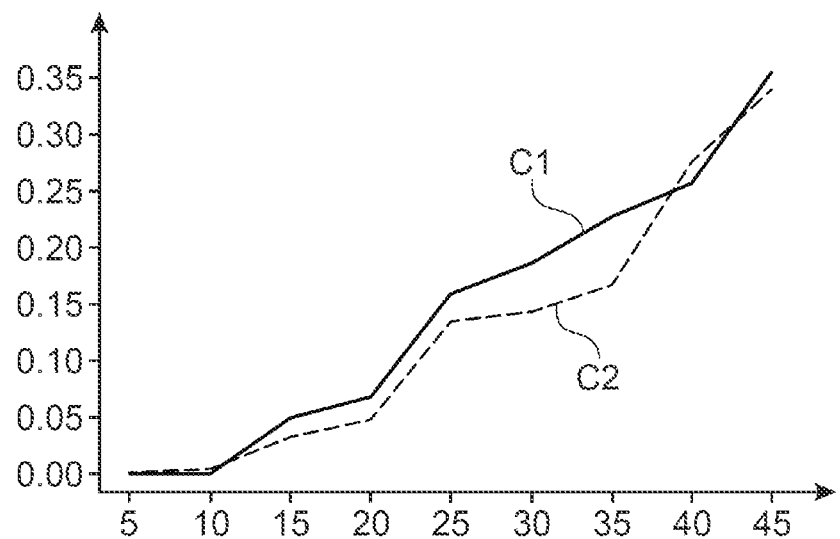
FIGS. 4A and 4B illustrate the comparison between estimated wear values and actual wear measurements, according to one embodiment of the disclosure herein.
Figure 4B:
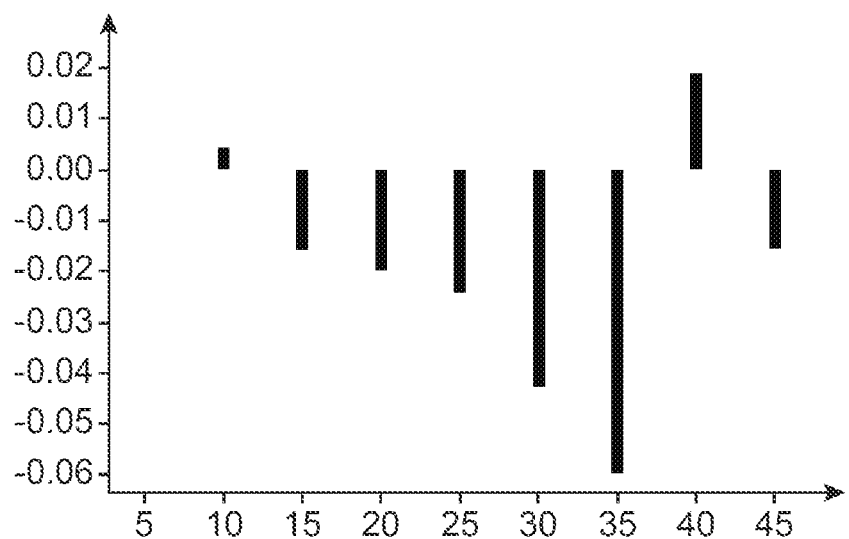

By way of example, FIGS. 4A and 4B illustrate the comparison between estimated wear values and actual wear measurements.

According to this example, the estimated wear values $V_1$ are evaluated by a wear model 21 constructed by using a linear regression algorithm. The graph of FIG. 4A has the wear in mm on the ordinate and the number of sequences on the abscissa. The wear values range from 0 (new tool) to 0.35 mm (fully worn tool). In practice, a wear of 0.25 mm is considered to be 100% wear.

Curve C1 represents the actual wear measurements $M_1$ while curve C2 represents the wear values $V_1$ estimated by the wear model 21. Graph 4B illustrates the difference (i.e. the error) between curves C1 and C2 and shows that the maximum error between the actual measurements and the estimated wear values is 0.06 mm, which equates to an error of less than 1%.

Figure 5:
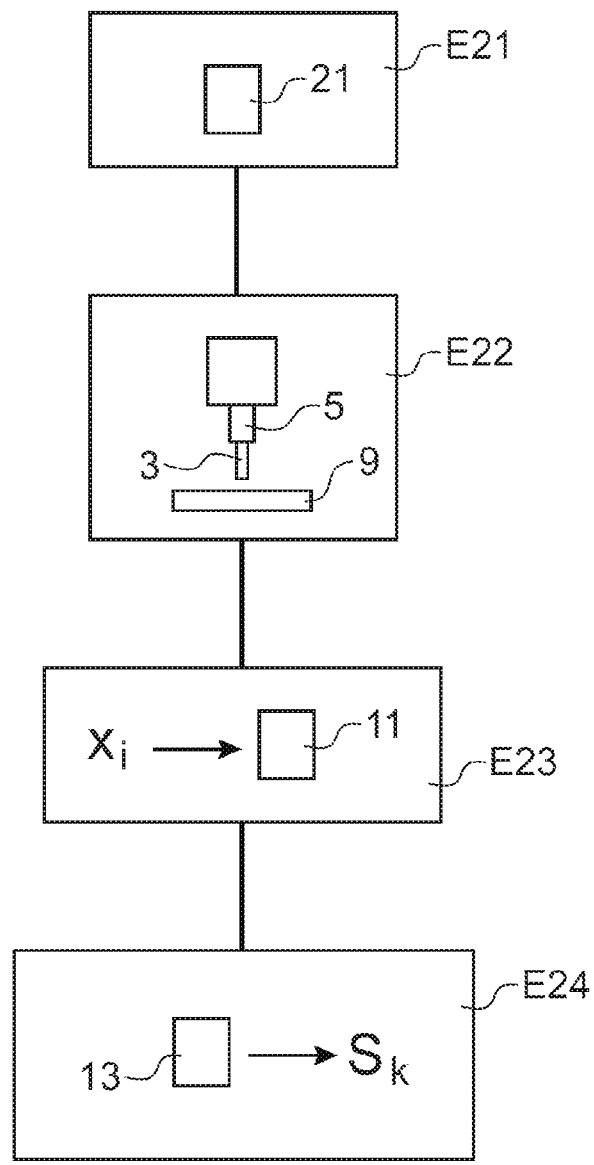
FIG. 5 is a flowchart schematically illustrating a method for estimating the state of wear of a cutting tool, according to one preferred embodiment of the disclosure herein.

FIG. 5 is a flowchart schematically illustrating a method for estimating the state of wear of a cutting tool, according to one preferred embodiment of the disclosure herein.

In step E21, the cutting pattern to be applied to the part 9 and the wear model 21 developed for the type of cutting tool 3 of interest, which is mounted on the spindle 5 of the machine tool 7, is downloaded.

In step E22, the selected cutting tool 3 is arranged on its tool holder, the tool holder is arranged on the spindle 5 of the machine tool 7 and the part 9 to be machined is put in place.

In step E23, the acquisition module 11 is configured to acquire a set of values $X_i$ of the operating signal specific to the cutting tool 3 when the machining sequence starts and/or ends.

According to a first embodiment, the acquisition module 11 is configured to acquire an exit operating signal when the cutting tool 3 is removed from the material.

It is sufficient to have just one from between the input and output operating signals. However, the fact that the exit signal gives the wear of the cutting tool 3 when exiting makes it possible to determine whether the tool 3 is still suitable for performing another machining operation.

According to a second embodiment, the acquisition module 11 is configured to acquire an entry operating signal when the cutting tool 3 is introduced into the material.

According to a third embodiment, the acquisition module 11 is configured to acquire an entry operating signal when the cutting tool 3 is introduced into the material and an exit operating signal when the cutting tool 3 is removed from the material.

In steps E25-E26, the microprocessor 13 is configured to extract a wear signature from the operating signal and to determine the state of wear of the cutting tool 3 according to this signature.

More particularly, in step E25, the microprocessor 13 is configured to determine the signature Sk by calculating a rolling standard deviation of the operating signal.

In step E26, the microprocessor 13 is configured to determine the state of wear of the cutting tool of interest by using the wear model 21 downloaded in step E21 which models the state of wear of a cutting tool 3 of the same type as the cutting tool in operation according to the values of the rolling standard deviation.

Thus, the estimation system and method according to the disclosure herein make it possible to indirectly and very precisely measure the level of wear of a cutting tool of interest during the machining process and make it possible to warn in real time of premature wear. The disclosure herein also makes it possible to optimally manage the service life of the cutting tool. Additionally, the estimation system consumes very little computing power and requires very little additional hardware, facilitating its integration into all sorts of industrially used machine tools.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for estimating a state of wear of a cutting tool mounted on a machine tool, the system comprising:
    an acquisition module configured to acquire, for any machining sequence of a plurality of sequences within a service life of the cutting tool, at least one operating signal specific to the cutting tool during at least one introduction interaction during which the cutting tool is introduced into a material to be machined or withdrawal interaction during which the cutting tool is withdrawn from the material, and
    a microprocessor configured to generate, on a basis of the at least one operating signal corresponding only to the at least one introduction interaction or withdrawal interaction of the machining sequence, a wear signature of wear of the cutting tool and to determine the state of wear of the cutting tool within the service life of the cutting tool according to a comparison of the wear signature to a predetermined wear model.

2. The system of claim 1, wherein the acquisition module is configured to acquire an exit operating signal when the cutting tool is withdrawn from the material.

3. The system of claim 1, wherein the acquisition module is configured to acquire an entry operating signal when the cutting tool is introduced into the material and an exit operating signal when the cutting tool is withdrawn from the material.

4. The system of claim 1, wherein the operating signal specific to the cutting tool mounted on the machine tool is a signal selected from the group consisting of power of electric current flowing in the machine tool, torque, intensity of electric current flowing in the machine, and vibration.

5. The system of claim 1, wherein the wear signature is defined by a rolling standard deviation of the at least one operating signal.

6. The system of claim 1, wherein the predetermined wear model models a state of wear of a cutting tool of a same type as the cutting tool in operation according to values of the rolling standard deviation.

7. The system of claim 6, wherein, in a training phase, the acquisition module is configured to:
    detect a start and/or an end of each training machining sequence from among a succession of sequences;
    acquire a set of values of the operating signal specific to the cutting tool when each training machining sequence starts and/or ends; and
    acquire a set of actual measurements of the wear over the succession of sequences, taking each actual wear measurement after a determined number of training machining sequences;
    and wherein the microprocessor is configured to:
    calculate a rolling standard deviation per machining sequence on a basis of values of the operating signal that are acquired in the training machining sequence, thus forming a set of signatures,
    construct the wear model by applying a regression technique configured to calibrate the set of signatures on the set of actual measurements of the wear, and
    validate the wear model when a difference between the actual measurements of the wear and wear values estimated by the wear model does not cross a predetermined threshold.

8. The system of claim 7, wherein the succession of training machining sequences starts with a new cutting tool and ends when the cutting tool is fully worn.

9. A machine tool comprising the system for estimating the state of wear of a cutting tool of claim 1.

10. A method for estimating state of wear of a cutting tool mounted on a machine tool, the method comprising:
    acquiring, for any machining sequence of a plurality of sequences within a service life of the cutting tool, at least one operating signal specific to the cutting tool during at least one introduction interaction during which the cutting tool is introduced into a material to be machined or withdrawal interaction during which the cutting tool is withdrawn from the material;
    generating, on a basis of the at least one operating signal corresponding only to the at least one introduction interaction or withdrawal interaction of the machining sequence, a wear signature of wear of the cutting tool; and
    determining the state of wear of the cutting tool within the service life of the cutting tool according to a comparison of the signature to a predetermined wear model.

* * * * *